United States Patent [19]
Caldwell

[11] Patent Number: 5,495,408
[45] Date of Patent: Feb. 27, 1996

[54] METHOD AND APPARATUS FOR SIGNAL TRACKING USING FEEDBACK CONTROL LOOP

[75] Inventor: William C. Caldwell, Marion, Iowa

[73] Assignee: Rockwell International Corporation, Seal Beach, Calif.

[21] Appl. No.: 336,723

[22] Filed: Nov. 9, 1994

Related U.S. Application Data

[63] Continuation of Ser. No. 897,187, Jun. 10, 1992, abandoned.

[51] Int. Cl.$^6$ ................................................. G05B 13/04
[52] U.S. Cl. ......................... 364/153; 364/149; 364/157
[58] Field of Search .......................... 381/83; 364/157, 364/149–153, 148, 160–165

[56] References Cited

U.S. PATENT DOCUMENTS

| | | | |
|---|---|---|---|
| 3,651,428 | 3/1972 | Brander | 331/173 |
| 4,313,209 | 6/1982 | Drucker | 455/112 |
| 4,386,236 | 5/1983 | Ferrieu et al. | 179/1 VL |
| 4,546,426 | 10/1985 | Hafner et al. | 364/149 |
| 4,817,160 | 3/1989 | DeKoning et al. | 381/83 |
| 5,014,309 | 5/1991 | West, Jr. | 380/7 |

Primary Examiner—Roy N. Envall, Jr.
Assistant Examiner—Thomas E. Brown
Attorney, Agent, or Firm—Kyle Eppele; M. Lee Murrah; George A. Montanye

[57] ABSTRACT

A feedback control loop having a variable attenuator controlled by oscillation detector means and overshoot detector means to better track the input signal. The oscillation detector means utilizes an estimated signal value compared to a subsequent measured value with the absolute difference of the two compared to predetermined threshold values. Should the calculated difference exceed predetermined threshold values, the variable attenuator value is adjusted and the process repeated after a brief disabling period to allow settling.

In addition to the oscillation detector, an overshoot detector means may also be used alone or in combination with oscillator detector means to control the variable attenuator setting.

7 Claims, 2 Drawing Sheets

METHOD AND APPARATUS FOR SIGNAL TRACKING USING FEEDBACK CONTROL LOOP

This application is a file wrapper continuation of application Ser. No. 07/897,187 filed Jun. 10, 1992, now abandoned.

BACKGROUND OF THE INVENTION

This invention was made with Government support under Contract No. F04701-85-C-0038 awarded by U.S. Air Force Systems Command. The Government has certain rights in this invention.

This invention relates to feedback control loops and more specifically to accurately tracking input signals with a feedback control loop.

A wide variety of signals may be readily processed using existing feed back control loop techniques. In tracking any given signal with prior art feedback control loops, instability difficulties may result from an uncontrollable gain in the feedback control loop, thereby diminishing the effectiveness of further signal processing.

Prior art methods of compensating for this problem focus upon the use of limiter devices with preset values for controlling the feedback control loop response to signal gain. The effect of the use of limiters is to cyclically drive the signal from a maximum value to a minimum value back to a maximum value and so on. This bouncing of the signal from a high to low value maintains the signal within a given value window, however the feedback control loop does not actually respond to signal fluctuations.

The present invention effectively replaces the hard limit values with a variable attenuator having the ability to respond to detected gain drift.

SUMMARY OF THE INVENTION

The present invention comprises an apparatus and method of tracking any given signal using a feedback control loop means.

A feedback control loop is disclosed having a variable attenuator controlled by oscillation detector means and overshoot detector means, either in combination or independently of each other, means to better track the input signal. The oscillation detector means utilizes an estimated signal value compared to a subsequent measured value with the absolute difference of the two values compared to predetermined threshold values. Should the calculated difference exceed predetermined threshold values, the variable attenuator value is adjusted and the process repeated after a brief disabling period to allow settling of the processed signal.

In addition to the oscillation detector, an overshoot detector means may also be used to estimate the forward gain in the feedback control loop via measuring the time response of loop to its initial error.

It is an object of the present invention to provide a feedback control loop responsive to signal instability.

It is a feature of the present invention to accomplish signal tracking by using variable attenuation means.

It is an additional feature of the present invention to utilize oscillation detection means and overshoot detection means to control the variable attenuation means.

It is an advantage of the present invention to provide an apparatus that eliminates the signal variance characteristics resulting from the use of limiters in tracking loops.

It is an additional advantage of the present invention to provide a method of controlling a variable attenuator in a feedback control loop to achieve improved signal tracking capabilities.

These and other objects, features and advantages are disclosed and claimed in the specification, figures and claims of the present application.

DETAILED DESCRIPTION OF THE FIGURES

Figure 1:
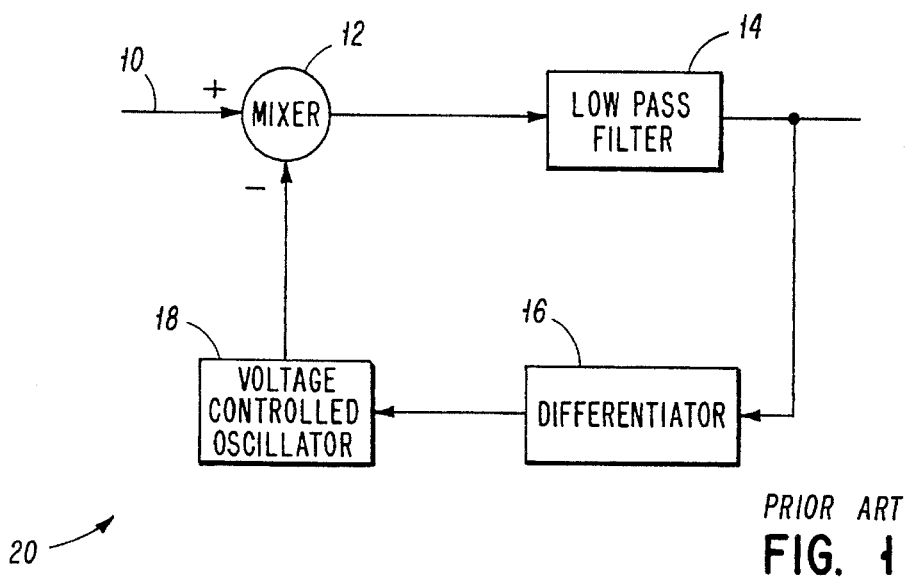
FIG. 1 and 1A represent a simplified diagram of a feedback control loop and a plot of its respective signal as known in the prior art.

Referring now to the Figures where like items are referenced as such throughout, FIG. 1 illustrates in block format a typical feedback control loop as known in the prior art. An input signal 10 is coupled through a mixer 12 and to a low-pass filter 14. The output signal of low-pass filter 14 is coupled to additional processing means (not shown) and looped back to the mixer 12 through a differentiator 16 and a voltage controlled oscillator (VCO) 18 cascadedly coupled to complete the feedback control loop 20. Since the mixer output signal is proportional to phase error it is filtered, differentiated and used to control VCO 18.

Figure 1A:
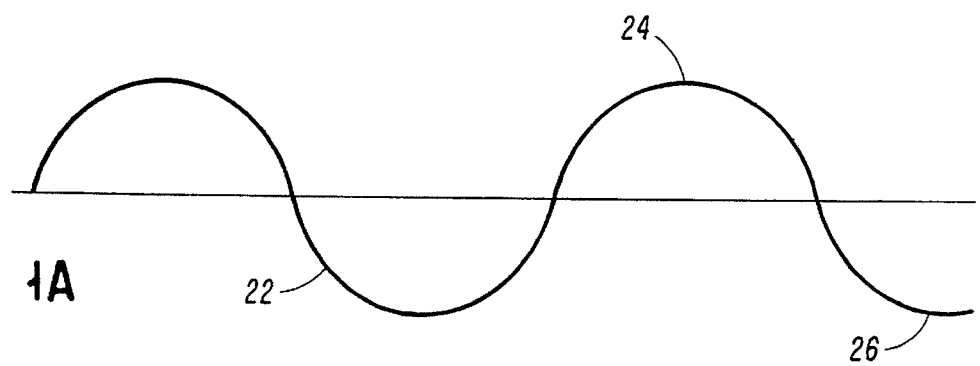

Curve 22 of FIG. 1A illustrates a graphic plot of a typical input signal 10 over a given time period (t). Due to increased gain, signal processing may become impeded, thereby indicating the need for controlling the extreme values 24 and 26 of signal curve 22.

Figure 2:
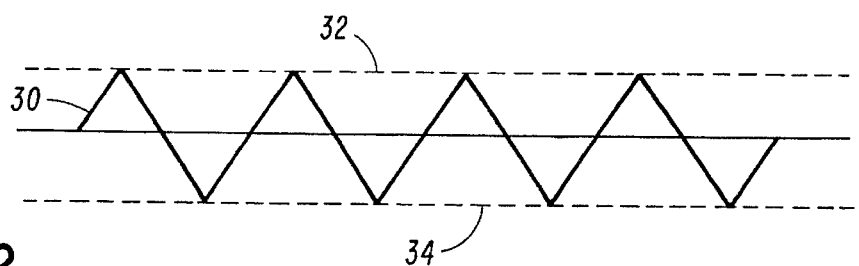
FIG. 2 illustrates the plot of the signal of FIG. 1, with maximum and minimum limit values inserted in the feedback control loop.

By utilizing techniques of the prior art, such as the inclusion of limiters to establish maximum and minimum signal values, the plotted curve representing the input signal, takes the appearance of a sawtooth curve 30 of FIG. 2. Curve 30 graphically illustrates that while maintaining the signal value within preset limits 32 and 34, (whose values are arbitrarily selected), the instantaneous curve value continually proceeds on a cyclical direct path towards the next limit value.

Figure 3:
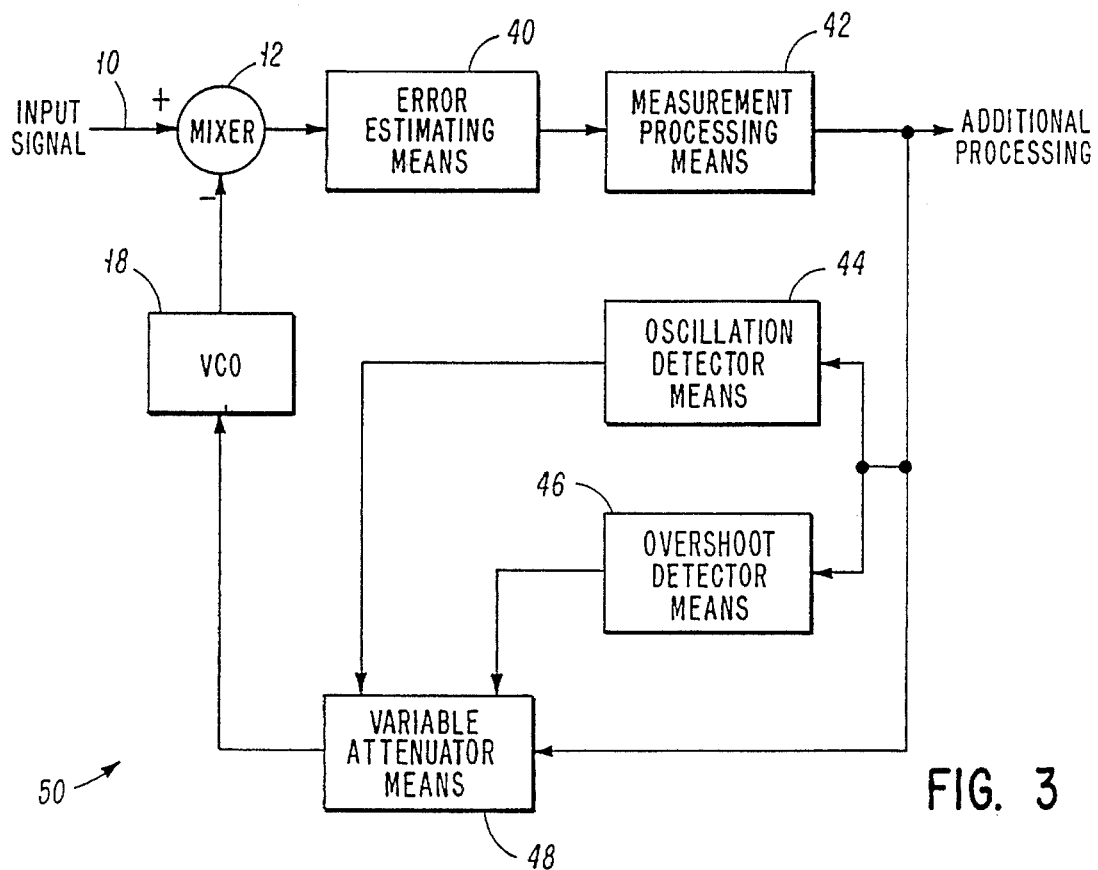
FIG. 3 represents a simplified diagram of a feedback control loop as disclosed in the present invention.

FIG. 3 illustrates in block diagram form, the teachings of the present invention. Although described in terms of a feedback control loop used in a phase tracking control application, the concepts disclosed may also be used in a wide variety of applications using feedback control loops. Accordingly, the illustration of a phase tracking feedback control loop is provided as an example of the present invention and not to be intended as a limitation of its usefulness. An input signal 10 is coupled to a mixer 12 having its output coupled to an error estimating means 40 which in turn is connected to a measurement processing means 42. The output from measuring processing means 42 is coupled in parallel to an oscillation detector means 44, an overshoot detector means 46, a variable attenuator means 48, and on to additional signal processing means (not shown). The output from both the oscillation detection means 44 and overshoot detection means 46 are coupled to and control the variable attenuator means 48. The output of variable attenuator means 48 is coupled through a VCO 18 to mixer 12, thereby completing feed back control loop 50. It is understood that loop 50 is a phase tracking loop and as such may be so referred to throughout this document.

In one embodiment of the above described apparatus the unique aspects of the present invention will be operationally described in detail. The particular application was in a Global Positioning System receiver apparatus. It is understood that use of the GPS embodiment is for example purposes and not intended as a limitation with respect to the present invention.

In addition to the signal processing steps that are well known in the prior art, the present invention includes oscillation detector means 44, overshoot detector means 46 and variable attenuator means 48 in feedback control loop 50. The variable attenuator means 48 serves to reduce the forward loop gain in incremental steps that are of a value small enough to keep tracking loop 50 stable while simultaneously large enough so as to avoid continual readjustment.

The object of the oscillation detector 44 is to determine if the variable attenuator 48 needs to be changed. The oscillation detector looks for the presence of an oscillation in the computed code velocity error. If an oscillation is present, then the variable attenuator value is increased. The oscillation detector may then be briefly disabled in order to monitor the result of the change to the variable attenuator value.

Similarly, the oscillation detector means also detects the need to decrease the attenuation of the tracking loop. When the attenuation is decreased, the oscillation detector may again be briefly disabled in order to evaluate the effects of the change in the variable attenuator value.

The oscillation detector means 44 looks for the presence of an oscillation in the tracked signal 10. It assumes a certain frequency of oscillation and looks for maxima and minima values to occur at a separation of one half of the period of oscillation. The instantaneous value is differenced from the assumed value at one half period intervals and its absolute value taken. Mathematically stated, Equation 1) $OD=|NE-OE|$ Where,
OD=Oscillation Detector calculated value
NE=New Error Value
OE=Old Error Value The absolute value of the difference of the two values may be low pass filtered and is used to provide an estimate of the probability of the presence of an oscillation.

The calculated value OD is compared to two previously determined threshold values $TV_1$ and $TV_2$. Where $TV_1$ and $TV_2$ represent an upper threshold or maximum value and a lower threshold or minimum value, respectively. If the calculated value, OD exceeds the higher threshold value $TV_1$, the variable attenuator means value is adjusted and the threshold comparison disabled for a full period of oscillation. The measuring and evaluation process then resumes. If the unacceptable oscillation has been removed, then the differenced value, OD will decrease sufficiently to keep the value of variable attenuator 48 from being changed. If an unacceptable oscillation is still present within the signal, a subsequent change will be made to the value of the variable attenuator with the process repeating itself until no discernible oscillation is detected.

Should the calculated value, OD fall below the lower threshold value $TV_2$ while the variable attenuator 48 is set at its lowest setting, then attenuation will be reduced and the threshold compare will be eliminated.

In one specific embodiment, attenuation steps of 0.5 in value satisfied the requirement of stabilizing the tracking loop while avoiding unnecessary attenuation value change. Since the tracking loop 50 is usable for open loop gains between 5 and 20, there exists ample margin for setting the open loop gain. A primary goal of the design of the specific embodiment described was to maintain open loop gain between 5 and 20. Steps of 0.5 effectively achieved such goal.

The maximum uncompensated open loop gain for the specific embodiment was approximately 45. The unit step loop response settled fastest with an open loop gain of approximately 10. Minimum attenuation yields a result of unity gain. Stated another way, the variable attenuator 48 will not effect the processing of signal 10 at the attenuator's minimum value. When using an open loop gain of 10, the corresponding gain of the variable attenuator would be 0.5. A determination was made by evaluating the unit step response to err on the low side of the open loop gain. Thus, the gain for maximum attenuation was selected as 0.125. The variable attenuator settings were accordingly determined to be 1, 0.5, 0.25, and 0.125 respectively.

In a manner similar to the oscillator detector means, the overshoot detector means 46 also provides control over variable attenuator means 48. The overshoot detector was particularly useful in a phase tracking loop that had a component whose gain was unkown and varied. The overshoot detector determined the forward gain in a feedback control loop by observing the time response of the loop to its initial error. Thus, overshoot detector means 46 rapidly estimates the forward gain with minimal information, thereby providing a highly responsive control mechanism.

Under any set of initial conditions, the phase tracking loop could be stabilized if the loop could track through the first half cycle of the potential oscillation. Unfortunately, the phase tracking loop often lost lock in less than one half cycle of the oscillation. One half cycle was approximately 100 milliseconds of 5 samples of the signal error. Further there was no single initial setting of the variable attenuator which would work over a wide range of signal conditions. The particular embodiment tracking loop required some method of setting the variable attenuator instantaneously in order to track the signal for the first half cycle.

The primary object of the overshoot detector means 46 was to quickly establish the initial value of the variable attenuator. If the value of the initial input is approximately known, a workable estimate of the forward gain would result from the first signal measurement. In other words, the variable attenuator could be set in 20 milliseconds or one fifth of the potential oscillation.

Figure 4:
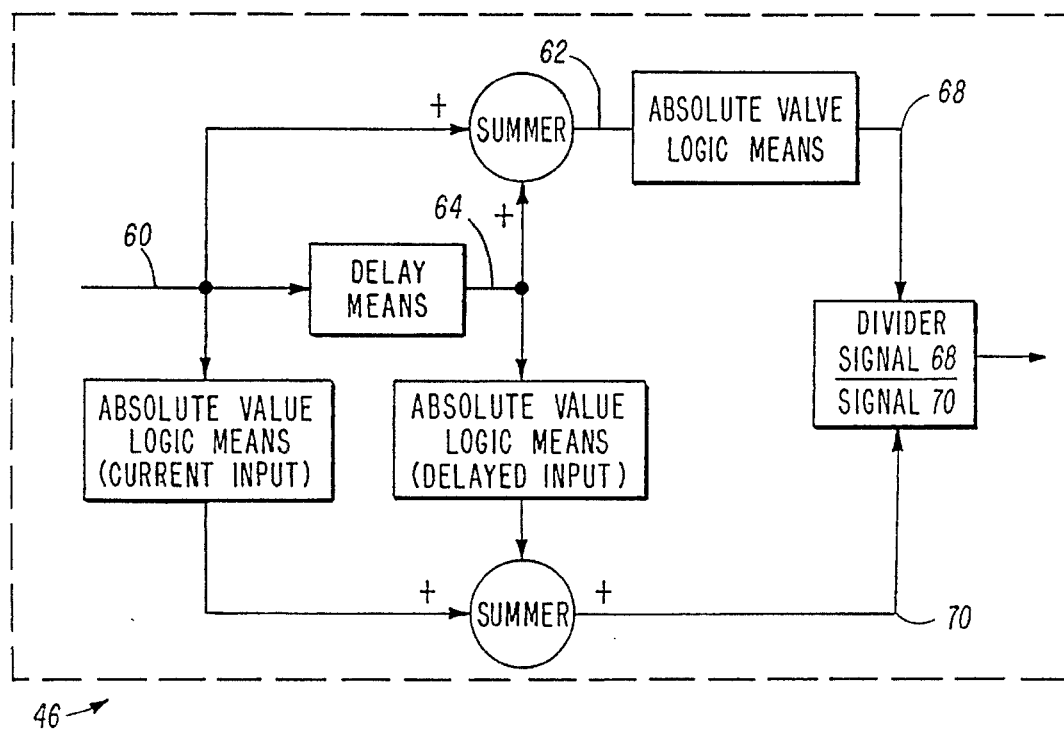
FIG. 4 illustrates a block diagram of one embodiment of the overshoot detector means of the present invention.

The overshoot detector means 46 signal flow diagram is shown in FIG. 4. The input 60 is delayed an amount equal to one sampling period. Summer 62 combines the delayed signal 64 with a current signal input 60. Signal 68 represents the absolute value of summer 62. Signal 70 represents the absolute value of the current signal summed with the absolute value of the delayed signal 60. The value of signal 68 is divided by the value of signal 70 thereby providing the overshoot detector means value. Mathematically., the function may be represented as follows:

Equation #2) $OV=|IE+FE|/|IE|+|FE|$

Where,
OV=Overshoot Detector Value
IE=Initial Error

FE=First Measured Error

Figure 5:
FIG. 5 represents a plot of a typical tracked signal utilizing the means and methods described herein.

FIG. 5 illustrates an exemplary plot of a tracked loop signal 80 versus time reflecting the teachings of the present invention.

It is thought that the apparatus and method of the present invention and many of its attendant advantages will be understood from the foregoing description, and it will be apparent that various changes may be made in the form, construction and arrangement of the parts and the steps thereof without departing from the spirit and scope of the invention, or sacrificing all their material advantages, the forms described herein being merely preferred embodiments thereof.

We claim:

1. A method of adjusting a variable attenuator in a feedback control loop having an oscillator detector means and overshoot detector means comprising the steps of:

receiving an oscillation input signal;

estimating the oscillation signal value;

determining an upper threshold value and a lower threshold value of the input signal;

measuring the oscillation signal value;

calculating the absolute value of the difference in the measured signal to the estimated value;

comparing the calculated difference to the upper and lower threshold values; and adjusting, within one frequency cycle, the variable attenuator value should the calculated difference in the measured signal and the estimated value exceed a threshold value by increasing the variable attenuator setting if the upper threshold value is exceeded or decreasing the variable attenuator setting if the lower threshold value is exceeded.

2. The method of claim 1, wherein the predetermined threshold values represent a maximum value established at one-half cycles and a minimum value.

3. The method of claim 1, further comprising the initial value of the variable attenuator being established by the overshoot detector means.

4. The method of claim 1, wherein the feedback control loop is a phase tracking control loop having a voltage controlled oscillator.

5. The method of claim 1, wherein the feedback control loop is an amplitude tracking control loop having a voltage controlled oscillator.

6. The method of claim 1, wherein the variable attenuator means is adjusted in incremental steps of 0.5.

7. The method of claim 1 further comprising the step of tolling the measurement process for a period equal to one full oscillation period in order to allow the tracking loop to settle after adjustment.

\* \* \* \* \*